Aug. 18, 1953  F. G. CIZEK  2,649,113
PRESSURE SELECTOR VALVE
Filed Jan. 2, 1948  3 Sheets-Sheet 1
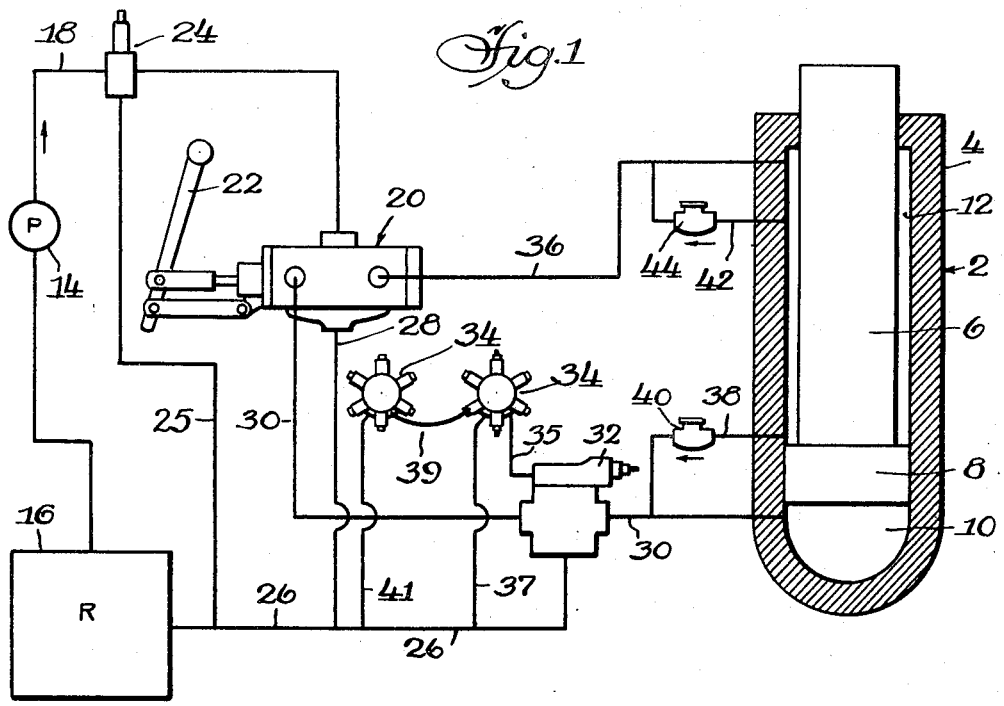
Fig. 1
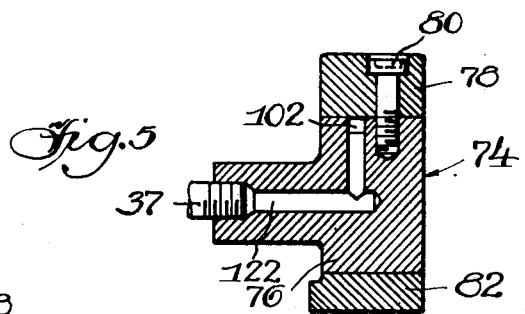
Fig. 5
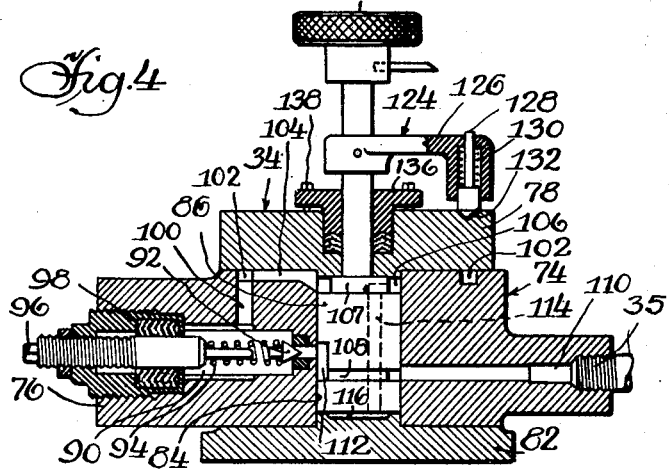
Fig. 4
Inventor
FRANK G. CIZEK
BY 
ATTY.

Aug. 18, 1953        F. G. CIZEK        2,649,113
PRESSURE SELECTOR VALVE
Filed Jan. 2, 1948                        3 Sheets-Sheet 2
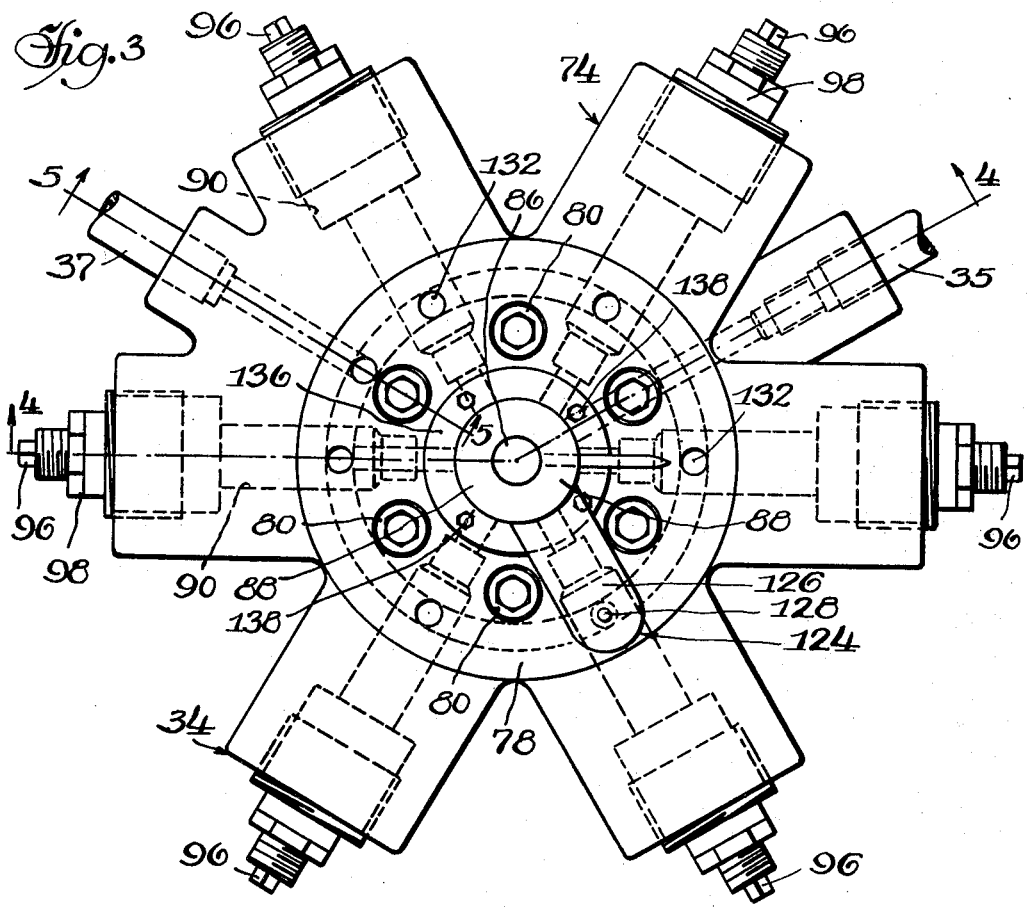
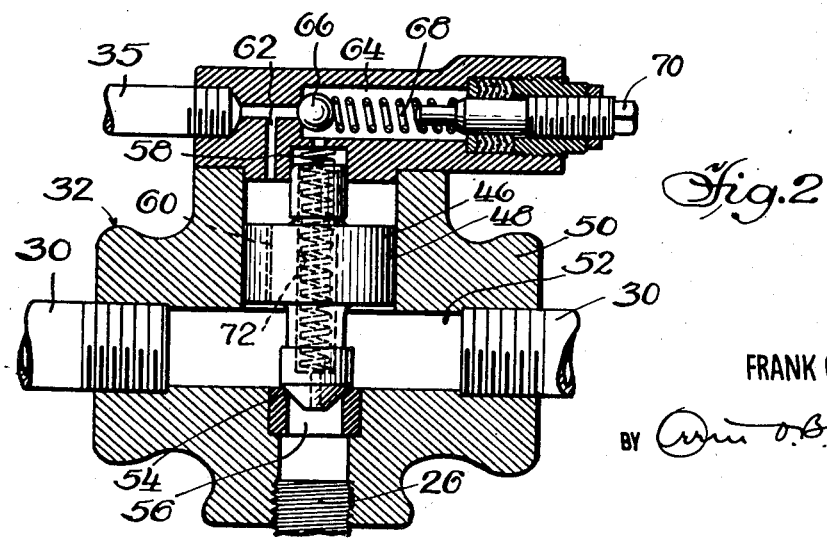
Inventor
FRANK G. CIZEK
ATTY.

Aug. 18, 1953   F. G. CIZEK   2,649,113
PRESSURE SELECTOR VALVE
Filed Jan. 2, 1948   3 Sheets-Sheet 3
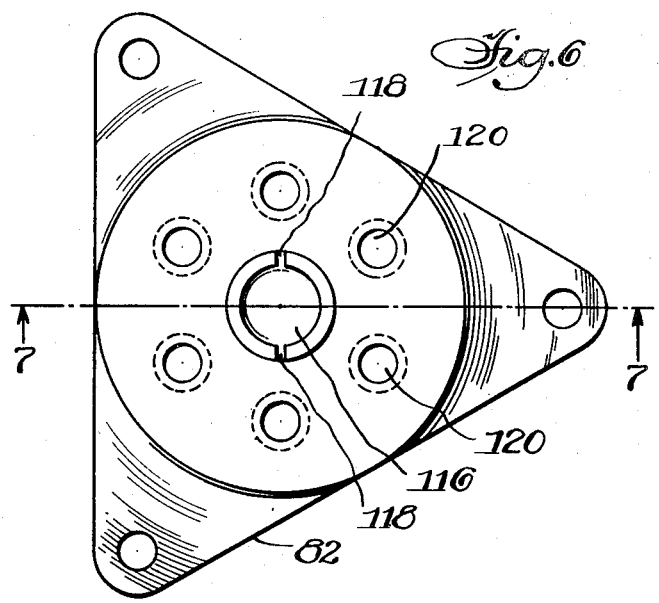
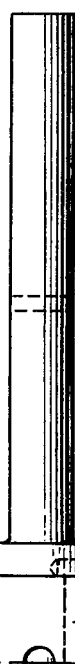
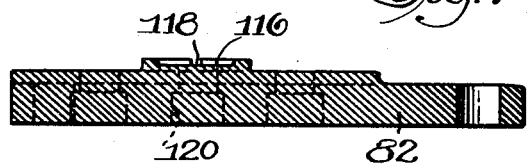
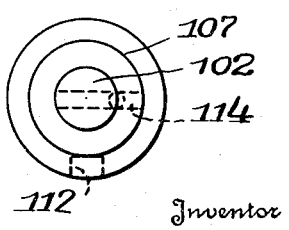
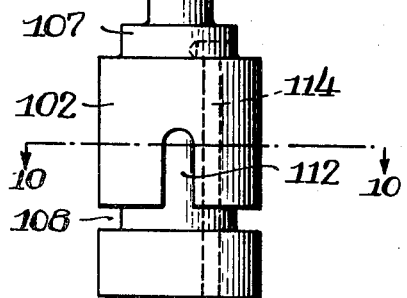
Inventor
FRANK G. CIZEK
By Ann B. Garner
ATTY.

Patented Aug. 18, 1953

2,649,113

UNITED STATES PATENT OFFICE 2,649,113

PRESSURE SELECTOR VALVE

Frank G. Cizek, Chicago, Ill., assignor to American Steel Foundries, Chicago, Ill., a corporation of New Jersey Application January 2, 1948, Serial No. 224

10 Claims. (Cl. 137—601)

This invention relates to hydraulic systems and more particularly to a novel pressure selector valve adapted to adjust the maximum operating pressure of an hydraulic system, such as is frequently utilized to actuate a device such as an hydraulic press.

The present application is divided out of my co-pending application Serial No. 657,816, filed March 28, 1946, for Adjustable Pressure Hydraulic System.

The present invention comprehends a novel selector valve having a number of pressure stations, any one of which may be used to conduct pressure to an associated selector valve having a plurality of pressure stations thus making it possible, for example, to develop eleven pressure values by two selectors, each comprising six stations.

A general object of the invention is to provide a valve, such as above described, which is simple and economical in construction and capable of rapid adjustment to select any one of several predetermined operating pressures according to the immediate demand of the work.

Another object of the invention is to design a valve adapted to be connected to a conventional pressure relief valve in the main supply line of an hydraulic system, such as above described, to quickly and simply adjust the pressure at which the relief valve opens.

A more specific object of the invention is to design a pressure selector valve comprising a body with a cylindrical bore and a plurality of discharge ports communicating therewith, said bore being adapted for the reception of a complementary stem rotatable therewithin and comprising passage means for selectively placing the ports in communication with the inlet port of the device.

The foregoing and other objects and advantages of the invention will become apparent from a consideration of the following specification and the accompanying drawings wherein:

Figure 1 is a flow diagram of an hydraulic circuit incorporating the novel pressure selector valve, said circuit being operatively connected to a typical hydraulic motor partially shown in central vertical cross section;

Figure 2 is an enlarged central vertical sectional view through the conventional pressure relief valve shown in Figure 1, portions of the valve being shown in elevation;

Figure 3 is an enlarged top plan view of the novel pressure selector valve;

Figure 4 is a sectional view, partly in elevation, of the pressure selector valve taken in the vertical planes indicated by the lines 4—4 of Figure 3;

Figure 5 is a fragmentary vertical sectional view of the pressure selector valve taken in the vertical plane indicated by the line 5—5 of Figure 3;

Figures 6 and 7 illustrate the base plate portion of the selector valve body, Figure 6 being a top plan view of said base portion and Figure 7 being a sectional view taken on the line 7—7 of Figure 6; and Figures 8-10, inclusive, illustrate in detail the pressure selector valve stem or spindle, Figure 8 being a side elevation thereof, Figure 9 being a top plan view thereof, and Figure 10 being a sectional view taken on the line 10—10 of Figure 8.

Describing the invention in detail and referring first to the flow diagram illustrated in Figure 1, the hydraulic motor, generally designated 2, may be of any conventional design and as illustrated is in the form of a cylinder 4 with a ram 6 reciprocal therewithin, said ram comprising an enlarged cylindrical portion 8 slidably fitted within the cylinder to define advance and return chambers 10 and 12, respectively. It will be understood that the system is particularly applicable to an hydraulic press wherein granular material is pressed by means of the ram 6 into cavities of varying cross section. When it is desired to produce a substantially constant density throughout the mass of compressed material in the cavity, the material is often introduced in small increments, each increment being pressed with a different diameter punch and with a different gross tonnage. As the operation proceeds, each stroke must produce a different tonnage from the preceding stroke and from the succeeding stroke. An example of this type of work is the pressing of explosive material into artillery shells.

The hydraulic circuit associated with the motor 2 comprises a pump 14 having its suction side connected to a reservoir or tank 16, said pump having its discharge side connected to a pipe or line 18 connected to the inlet side of a conventional operating valve 20, said valve being actuated by a lever 22. A conventional safety relief valve 24 is provided in the line 18 between the pump 14 and the valve 20 for the purpose of permitting the pump 14 to discharge through a line 25 into the return or discharge line 26 in the event of blockage in the system, as, for example, jamming of the valve 20.

It will be understood by those skilled in the art that in the neutral position of the valve 20, the pressure fluid delivered by the pump 14 passes through the line 18 into the valve 20 and outwardly therefrom through the pipe or line 28 into the beforementioned discharge line 26. In the advance position of the valve 20, pressure fluid delivered by the pump 14 is conveyed outwardly from the valve 20 through the advance or main supply line 30 into the advance chamber 10 of the cylinder 4, thereby causing the ram 6 to be moved on the advanced stroke thereof. It may be noted that on the advance stroke of the ram 6, the hydraulic fluid within the chamber 12 is forced through the pipe 36 into the valve 20 and outwardly therefrom into the return line 26 through the pipe 28. When the ram reaches the end of its advance stroke, the fluid in the advance chamber 10 is conveyed from the cylinder 4 through a pipe 42 connected to the pipe 36 through a one-way check valve 44.

The pressure in the advance chamber 10 is regulated by a relief valve 32 in the line 30, said valve being adapted to open at a predetermined pressure to discharge into the before-mentioned discharge or return line 26. The pressure value at which the relief valve 32 opens is selectively varied, as hereinafter discussed, by one or more pressure selector valves 34. If desired, one valve 34 may be used and the inlet port thereof is connected by a pipe 35 to the relief valve 32, the outlet port of the valve 34 being connected by a pipe 37 to the return line 26 as hereinafter discussed. Where more than one valve 34 is desired, one of the discharge ports of the first valve 34 is connected by a pipe 39 to the inlet port of the other valve 34, the outlet port of which is connected by a pipe 41 to the return line 26. In this manner any desired number of valves 34 may be arranged in series to accommodate opening of the relief valve 32 at any desired number of predetermined pressure values.

In the return position of the valve 20, the pressure fluid delivered by the pump 14 to said valve is conveyed therefrom through a pipe or line 36 connected to the before-mentioned return chamber 12 of the cylinder 4, whereupon the ram 6 moves on the return stroke thereof to the point illustrated in the drawings, the hydraulic fluid in the chamber 10 being forced through the line 30 into the valve 20 and outwardly through the pipe 28 into the discharge line 26. In this connection it may be noted that when the ram 6 reaches the end of its return stroke, the pressure fluid in the return chamber 12 is conveyed from the cylinder 4 through an outlet pipe 38 connected to the line 30 through a one-way check valve 40.

Referring now to Figure 2, the relief valve 32 is illustrated in central vertical section, said valve being of the balanced piston type wherein the piston 46 is slidably fitted within a complementary bore 48 in the valve body 50 which is provided with a passage or chamber 52 normally conveying the fluid in the line 30 to and from the chamber 10. The piston 46 comprises a portion seated as at 54 against the inner extremity of a port 56 communicating with the discharge line 26, said piston being normally maintained in its closed position by a spring 58. The pressure at opposite sides of the piston 46 is balanced by a passage 60 therethrough, said passage communicating with an outlet port 62 connected to the before-mentioned pipe 35. The port 62 also communicates with a chamber 64 normally closed by a valve member 66 spring-pressed to its closed position by a spring 68 adjustably compressed by a screw 70. When the pressure in the line 30 reaches a predetermined maximum value, the valve member 66 is urged to its open position, thereby permitting the piston 46 to be urged upwardly by the hydraulic pressure in the line 30 to permit the pressure therein to pass into the discharge line 26, the fluid in the chamber 64 being drained through a central passage 72 through the piston 46. The valve member 66 is preferably adjusted to open at a predetermined maximum value so that the valve member 66 functions as a safety valve mechanism.

Referring now to Figures 3 to 5, inclusive, one of the pressure selector valves 34 is illustrated in detail, said valve comprising a body, generally designated 74. The body 74 comprises a member 76 with a cap 78 secured thereto by cap screws 80, 80 (Figure 3) and the body 74 also comprises a base plate portion 82 secured to the bottom of the member 76 in any convenient manner as by cap screws (not shown). The member 74 is provided with a cylindrical bore 84 (Figure 4) receiving a complementary stem or spindle 86 slidably fitted therewithin in substantially fluid-tight engagement therewith, said stem being rotatable by a handle or knob 88 for a purpose hereinafter described. The member 76 is formed with a plurality of discharge or relief ports 90 connected to the bore 84, each of said ports being closed by a valve member 92 springpressed to the closed position thereof by a spring 94 adjustably compressed against the valve member by an adjusting screw 96, said screw extending through a conventional packing gland assembly 98. Each port 90 is connected by a passage 100 to an annular passage 102 (Figures 4 and 5) in the form of a groove formed in the top of the member 76, said passage 102 being connected by a port 104 to a chamber 106 defined within the bore 84 by a reduced portion 107 of the stem 86. The passage 102 is also connected to the outlet port 122 of the valve body 74, as best seen in Figures 3 and 5, said outlet port being connected to the line 37 as mentioned above.

The stem 86 is provided with an annular groove or passage 108 communicating at all times with the inlet port 110 of the valve body 74 and communicating with a vertical groove 112 adapted to be selectively registered with the ports 90. It may be noted that by means of the annular groove 108, the stem 86 is substantially in lateral balance inasmuch as the pressure of the fluid within the bore 84 is substantially evenly distributed to the stem 86 around the perimeter thereof. It will be understood that a slight amount of hydraulic fluid may leak between the stem 86 and the surface of the member 76 defining the bore 84, despite the fact that these parts are slidably fitted in a substantially fluid-tight engagement; and this leakage fluid is conveyed to the annular passage 102 through the chamber 106 and the passage 104, the chamber 106 being connected by a passage 114 through the stem to a recess 116 in the base plate 82, said plate being provided with a plurality of grooves or slots 118, as best seen in Figures 6 and 7, for the purpose of conveying any leakage fluid to the recess 116. It may also be noted that the plate 82 is provided with a plurality of openings 120 therethrough for the reception of associated cap screws (not shown) securing the plate 82 to the body member 76.

It may be noted that by means of the passage 114 which is spaced from the groove 108 in the stem 86, the pressure within the chamber 106 is balanced by that within the recess 116 at the bottom of the spindle 86 to prevent the latter from being urged downwardly into binding relationship with the base plate 82.

It will be understood that the spring 94 within each port 90 is adjustably stressed to a predetermined pressure preferably different from that of the springs 94 within the other ports 90, and the stem 86 is rotatable by the handle 88 to selectively place the vertical groove 112 in communication with the respective ports 90, whereby the inlet port 110 is connected to any one of the discharge ports 90 at the selection of the operator. Thus the operating pressure at which the piston 46 of the relief valve 32 is moved to its open position may be regulated to any one of a plurality of predetermined values by rotating the stem 86 to place any desired port 90 in communication with the inlet port 110 of the valve 74.

In operation of the system, pressure from the relief valve 32 is conveyed by the pipe 35 to the bore 84 of the selector valve 74 and the pressure fluid enters the circumferential groove 108 and flows all the way around the stem 86 and into the groove 112. From the groove 112, the pressure fluid is conveyed to one of the ports 90 wherein the valve member 92 remains in the closed position thereof as long as the pressure remains below the predetermined value at which the valve member 92 is arranged to open. When the pressure reaches this predetermined value, the piston 92 is forced into the open position thereof, allowing the fluid to flow into the annular chamber 102 and thence into the outlet port 122 which is connected as above noted to the pipe 37 communicating with the discharge or relief line 26.

As a result of the opening of the valve member 92, the pressure in the relief valve 32 is reduced as above described in connection with the safety valve member 66, whereupon the relief valve piston 46 is permitted to move to the open position thereof to maintain the predetermined pressure value within the system.

Before initiating another advance stroke of the ram 6, the handle or knob 88 on the stem 86 may, if desired, be turned to some other position which delivers pressure fluid to some other port 90 wherein the valve member 92 is adjusted to open when the pressure in the system reaches another predetermined value. In this connection it may be noted that the stem 86 is maintained in each position thereof whereat the groove 112 communicates with one of the ports 90 by a detent mechanism, generally designated 124 and comprising an arm 126 carrying a latch pin 128 spring-pressed by a spring 130 into one of the shallow recesses 132 formed in the top of the cap member 78 of the body 74. The arm 126 may be secured to the stem 86 in any desired manner, as, for example, by a set screw.

It may be noted that the stem 86 extends through a complementary opening in the cap 78, said opening being sealed by a conventional packing gland assembly 136 maintained against accidental disassembly by a plurality of cap screws 138.

If desired, the valve member 92 and associated spring 94 may be removed from one of the ports 90 and said port may be connected by the beforementioned pipe 39 to the inlet port 110 of another pressure selector valve 34, as above described and shown in Figure 1. In this manner, any desired number of valves 34 may be arranged in series to provide any desired number of predetermined pressure levels at which the relief valve 32 will open. Thus, when the range of the first selector valve 34 is exhausted, the last position of the stem 86 may be selected, which sends pressure fluid over to the second selector valve 34, which may then operate through its range before delivering the pressure fluid to the next selector valve.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a selector valve, a body with an internal cylindrical bore, a cylindrical stem slidably fitted within said bore in substantially fluid-tight engagement therewith and rotatable therewithin, an annular passage in said body around said bore and connected thereto, said stem having a portion of reduced cross-section in the portion of said bore connected to said passage, a fluid passage extending axially through said stem and connected to said portion of said bore and to the portion thereof at the inner end of said stem, a plurality of spaced discharge ports in said body connected to said annular passage and to said bore, an inlet port in said body connected to said bore, an outlet port in said body connected to said annular passage, and valve means in each of said discharge ports for adjustably resisting flow of fluid from said bore, an annular groove in the periphery of said stem communicating with said inlet port, and another groove communicating with the first-mentioned groove and adapted to be selectively registered with the first-mentioned ports, one at a time, as said stem is rotated within said bore, and means for rotating said stem.

2. In a selector valve, a body with an internal cylindrical bore, a cylindrical stem slidably fitted within said bore in substantially fluid-tight engagement therewith and rotatable therewithin, an annular passage in said body around said bore and connected thereto, said stem having a portion of reduced cross-section in the portion of said bore connected to said passage, a fluid passage extending axially through said stem and connected to said portion of said bore and to the portion thereof at the inner end of said stem, a plurality of spaced discharge ports connected to said annular passage and to said bore, an inlet port in said body connected to said bore, an outlet port in said body connected to said annular passage, and fluid pasasge means in said stem spaced from said passages and communicating at all times with said inlet port, said passage means being adapted for selective communication with said first-mentioned ports, one at a time, as said stem is rotated within said bore, and means for rotating said stem.

3. A valve comprising a body with a cylindrical bore and a plurality of spaced radial ports disposed therearound and connected directly thereto, valve means in each port for yieldingly resisting flow of fluid from said bore, the respective valve means being adjustable to varying resistance to said flow, an inlet port in said body communicating with said bore, an outlet port in said body, said outlet port being connected to the first-mentioned ports, a cylindrical stem slidably fitted within said bore in substantially fluid-tight engagement therewith and rotatable therewithin, an annular groove in the cylindrical surface of said stem which engages said bore, said groove being registered with said inlet port, and a vertical groove in said surface communicating with said annular groove and adapted to be selectively engaged with the first-mentioned ports, one at a time, during rotation of said stem.

4. A pressure selector valve comprising a body with a cylindrical chamber therein, a cylindrical stem fitted in said chamber, a plurality of spaced discharge ports communicating directly with said chamber, the longitudinal axes of said ports being approximately radial to the axis of said chamber, adjustable valve means in each port for yieldingly closing the same against flow of fluid therethrough from said chamber, an inlet port communicating with said chamber, fluid passage means in said stem communicating at all times with said inlet port and adapted to be selectively registered with the first-mentioned ports, one at a time, as said stem is rotated in said chamber, an annular outlet chamber in said body around the first-mentioned chamber, an outlet port in said body connected to said annular chamber, fluid passage means connecting each of the first-mentioned ports to said annular chamber, and means for rotating said stem.

5. A valve comprising a body with a cylindrical bore and a plurality of spaced ports disposed therearound and connected directly thereto, valve means in each port movable radially with respect to the bore for yieldingly resisting flow of fluid from said bore, the respective valve means being adjustable to varying resistance to said flow, an inlet port communicating with said bore, an outlet port in said body, said outlet port being connected to the first-mentioned ports, and a cylindrical stem slidably fitted within said bore in substantially fluid-tight engagement therewith and rotatable therewithin, and fluid passage means in said stem communicating at all times with said inlet port and adapted to be selectively placed in communication with respective of the first-mentioned ports as said stem is rotated within said bore.

6. A valve comprising a body with a chamber and a plurality of spaced radial discharge ports connected directly thereto, valve means in each port for yieldingly resisting flow of fluid from said chamber into said port, means for adjusting the resistance of each valve means to said flow, an inlet port in said body communicating with said chamber, an outlet port in said body connected to the first-mentioned ports downstream of said valve means, and means in said chamber for selectively placing said discharge ports in communication with said inlet port.

7. A pressure selector valve comprising a body with a cylindrical chamber therein, a plurality of radial discharge ports through said body connected directly to the chamber, an inlet port connected to the chamber, a cylindrical valve stem fitted in the chamber and rotatable therein, said stem having passage means communicating at all times with the inlet port and selectively communicable with the discharge ports as said stem is rotated, independent adjustable valve means in respective discharge ports for yieldingly resisting flow of fluid into said ports at different pressure values, and an outlet port connected to all of said discharge ports downstream of said valve means.

8. A valve system comprising a pair of separate independent valves, each having a body with a cylindrical chamber, a stem fitted therein for rotation on the longitudinal axis thereof, a plurality of spaced discharge ports through said body approximately radial to said axis and communicating directly with said chamber, an inlet port connected to said chamber independently of said discharge ports, an outlet port connected to all of said discharge ports, and passage means in the stem communicating with the inlet port and selectively communicable with the discharge ports by rotation of said stem, the inlet port of one valve being connected to a discharge port of the other valve, and independent adjustable valve means in the other discharge ports of said other valve and in the discharge ports of said one valve for yieldingly resisting flow of fluid therethrough from the related chambers to regulate the pressure in the inlet port of said other valve.

9. A valve system comprising a pair of separable valves, each having a chamber, a plurality of spaced discharge ports connected to the chamber, an inlet port connected to the chamber independently of the discharge ports, an outlet port connected to the discharge ports downstream of the chamber, and means in the chamber for selectively connecting the inlet port to the discharge ports, the inlet port of one valve being connected to a discharge port of the other valve independently of the latter's outlet port, and independent adjustable valve means in the other discharge ports of said other valve and in the discharge ports of said one valve for yieldingly resisting flow of fluid downstream from respective chambers.

10. A valve system comprising at least a pair of separable valves, each having a chamber, a plurality of spaced discharge ports connected to each chamber, an inlet port connected to each chamber independently of the related discharge ports, each of said valves having means for selectively connecting its inlet port to the related discharge ports, the inlet port of one valve being connected to one discharge port of the other valve, the other discharge ports of both valves having means for adjusting the pressure of fluid discharged therefrom, each of said valves being provided with an outlet port, the outlet port of said other valve being connected to all of its discharge ports, except said one discharge port, and the outlet port of said one valve being connected to all of its discharge ports.

FRANK G. CIZEK.

References Cited in the file of this patent

UNITED STATES PATENTS

| Number | Name | Date |
|---|---|---|
| 600,829 | Donaldson | Mar. 15, 1898 |
| 2,292,963 | Nardone | Aug. 11, 1942 |
| 2,393,464 | Granberg | Jan. 22, 1946 |

FOREIGN PATENTS

| Number | Country | Date |
|---|---|---|
| 49,570 | Netherlands | of 1940 |